(12) United States Patent
Park et al.

(10) Patent No.: US 9,807,783 B2
(45) Date of Patent: Oct. 31, 2017

(54) SIGNALING METHOD FOR COMP SCHEME AND APPARATUS THEREFOR

(71) Applicant: LG ELECTRONICS INC., Seoul (KR)

(72) Inventors: Hanjun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 14/543,666

(22) Filed: Nov. 17, 2014

(65) Prior Publication Data

US 2015/0139009 A1    May 21, 2015

Related U.S. Application Data

(60) Provisional application No. 61/905,158, filed on Nov. 16, 2013.

(51) Int. Cl.
| | |
|---|---|
| *H04W 72/12* | (2009.01) |
| *H04L 1/00* | (2006.01) |
| *H04W 24/10* | (2009.01) |
| *H04W 72/04* | (2009.01) |

(52) U.S. Cl.
CPC ....... *H04W 72/1231* (2013.01); *H04L 1/0015* (2013.01); *H04W 24/10* (2013.01); *H04W 72/0426* (2013.01)

(58) Field of Classification Search
CPC ............... H04W 24/02; H04W 24/10; H04W 72/0406–72/0413; H04W 72/0426–72/0433; H04W 72/046; H04W 72/12; H04W 72/1226–72/1231; H04W 72/1278–72/1294; H04B 7/022–7/026; H04B 7/0413–7/0421; H04B 7/0619; H04B 7/0626; H04B 7/0632
See application file for complete search history.

(56) References Cited

U.S. PATENT DOCUMENTS

| | | | | |
|---|---|---|---|---|
| 2011/0249643 | A1* | 10/2011 | Barbieri | H04L 1/0026 370/329 |
| 2014/0036706 | A1* | 2/2014 | Mondal | H04W 24/08 370/252 |
| 2015/0358062 | A1* | 12/2015 | Skillermark | H04L 1/0026 370/329 |

* cited by examiner

*Primary Examiner* — Eric Myers
(74) *Attorney, Agent, or Firm* — Lee Hong Degerman Kang Waimey

(57) ABSTRACT

A method for link adaptation in a wireless communication system, the method performed by a user equipment (UE) and including measuring a channel state at a first time instance, reporting a measurement value of the channel state, and receiving scheduling based on the reported measurement value of the channel state from a serving base station at a second time instance. Traffic generation of a neighboring base station is restricted at least between the first time instance and the second time instance to accord the reported measurement value of the channel state with a channel state at the second time instance.

8 Claims, 11 Drawing Sheets

SIGNALING METHOD FOR COMP SCHEME AND APPARATUS THEREFOR

Pursuant to 35 U.S.C. §119(e), this application claims the benefit of U.S. Provisional Patent Application Ser. No. 61/905,158, filed on Nov. 16, 2013, the contents of which are hereby incorporated by reference herein in its entirety.

BACKGROUND OF THE INVENTION

Field of the Invention

The present invention relates to a wireless communication system, and more particularly, to a signaling method for a CoMP scheme and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present method is directed to a signaling method for a CoMP scheme and an apparatus therefor that substantially obviate one or more problems due to limitations and disadvantages of the related art.

An object of the present invention is to provide a method for more efficiently sending information between base stations for a CoMP scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for link adaptation performed by a user equipment (UE) in a wireless communication system includes measuring a channel state at a first time instance, reporting a measurement value of the channel state, and receiving scheduling based on the reported measurement value of the channel state from a serving base station at a second time instance. Traffic generation of a neighboring base station may be restricted at least between the first time instance and the second time instance to accord the reported measurement value of the channel state with a channel state at the second time.

Additionally or alternatively, the restriction on traffic generation of the neighboring base station may be periodically configured.

Additionally or alternatively, the restriction on traffic generation of the neighboring base station may be configured by negotiation between base stations or by a specific entity in the wireless communication system.

Additionally or alternatively, the method further comprises measuring a channel state at a third time instance, wherein the measuring the channel state at the third time instance may include measuring a dummy signal transmitted by the neighboring base station in resources for interference measurement to accord a value of the channel state measured at the third time instance with the channel state at a scheduling time instance based on the channel state measured at the third time.

In another aspect of the present invention, a method for link adaptation performed by a base station in a wireless communication system includes a user equipment (UE) receiving a value of a channel state measured at a first time instance, and transmitting scheduling based on the received value of the channel state to the UE at a second time instance. Traffic generation of a neighboring base station may be restricted at least between the first time instance and the second time instance to accord the received value of the channel state with the channel state at the second time.

Additionally or alternatively, the restriction on traffic generation of the neighboring base station may be periodically configured.

Additionally or alternatively, the restriction on traffic generation of the neighboring base station may be configured by negotiation between base stations or by a specific entity in the wireless communication system.

Additionally or alternatively, the method may further comprises receiving, from the neighboring base station, information indicating that traffic will be generated after a duration in which traffic generation is restricted; and correcting the received value of the channel state based on the information.

In another aspect of the present invention, a method for link adaptation performed by a base station in a wireless communication system includes receiving information about a duration in which traffic generation of the base station is restricted, delaying traffic generation in the duration according to the received information, and generating traffic after the duration. The restricted duration may be configured to accord a channel measurement value of a user equipment (UE) served by a neighboring base station with a channel state at a scheduling time instance for the UE based on the channel measurement value by the neighboring base station.

Additionally or alternatively, the method may further comprise transmitting a dummy signal using resources for interference measurement if traffic to be generated is present after the duration.

Additionally or alternatively, the method may further comprise transmitting, to the neighboring base station, information indicating that traffic will be generated after the duration if traffic to be generated is present after the duration.

Additionally or alternatively, the duration may be configured periodically.

Additionally or alternatively, the duration may be configured by negotiation between base stations or by a specific entity in the wireless communication system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
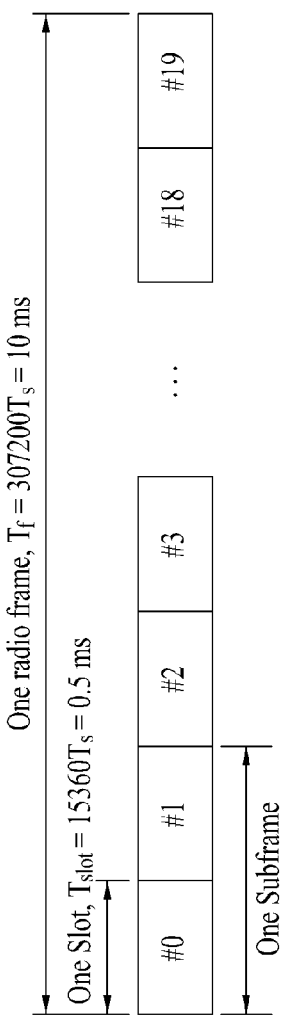
FIGS. 1(a) and 1(b) are diagrams showing an example of a radio frame structure used for a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/

PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Figure 1B:
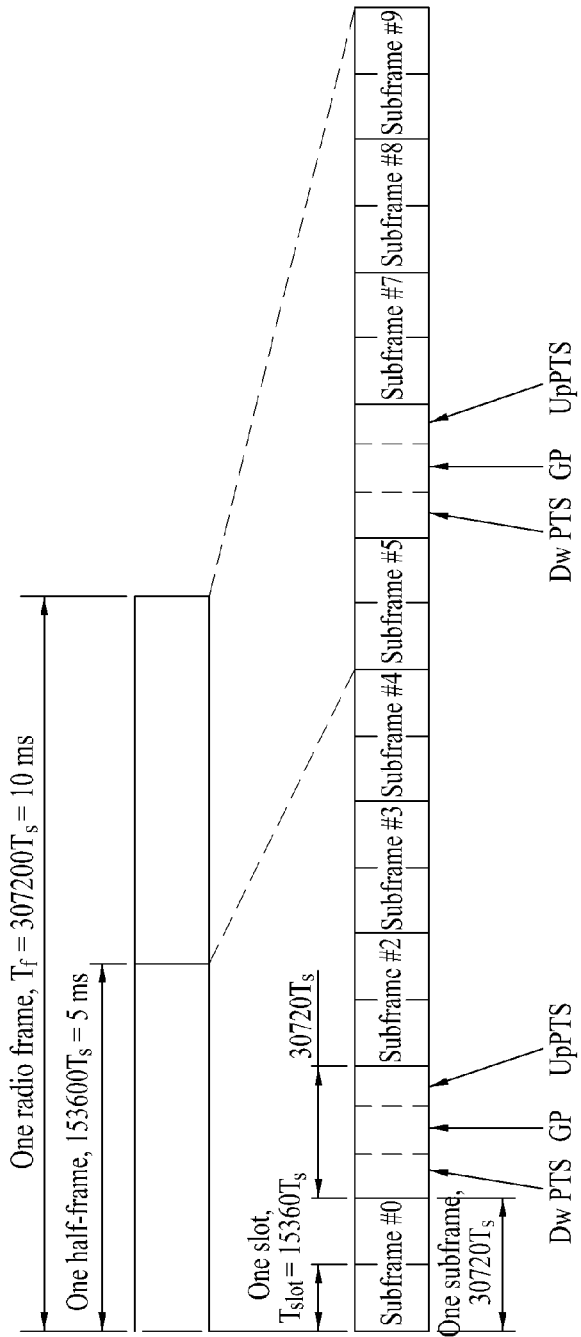

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
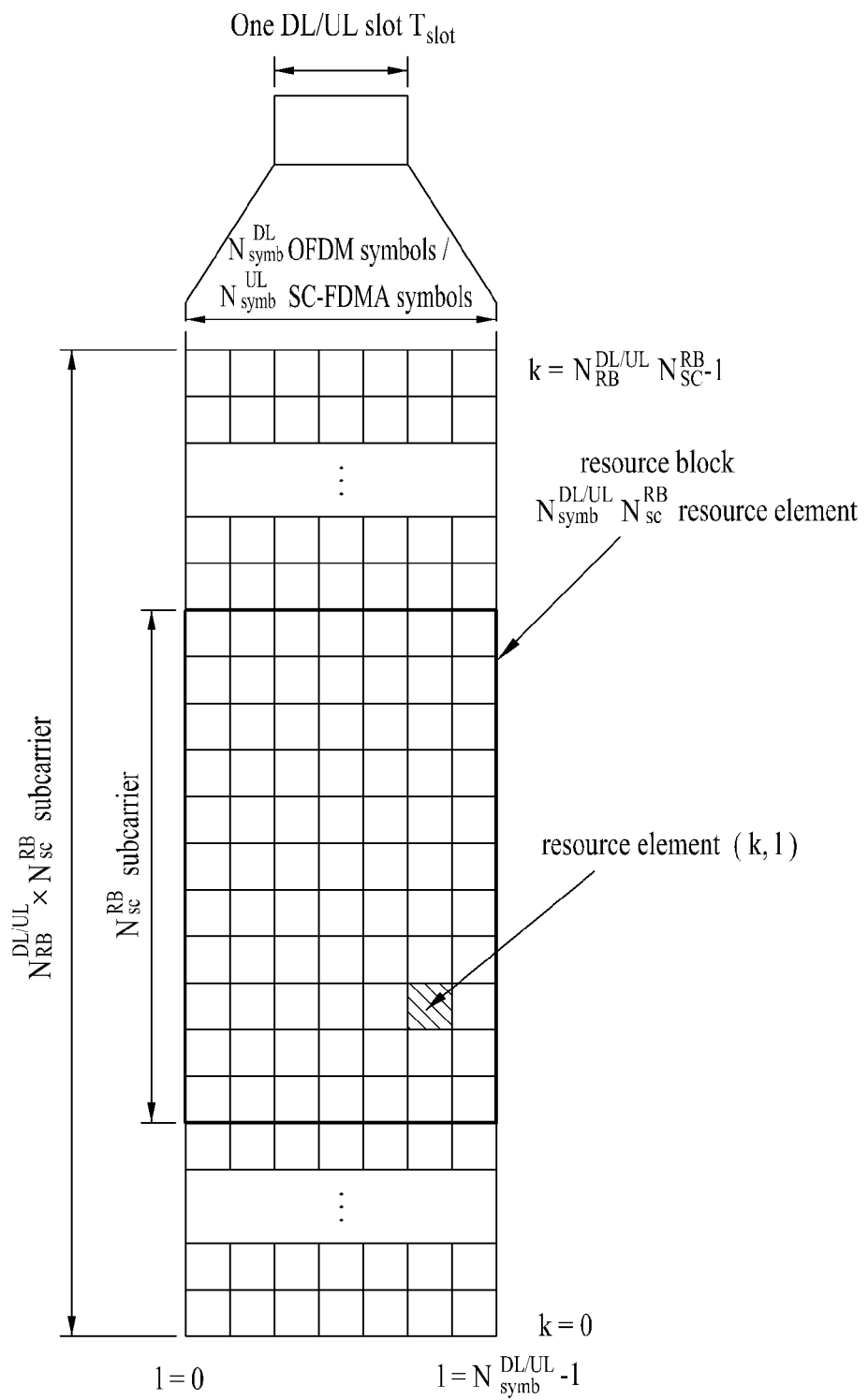
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{UL/DL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{RB}^{UL/DL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
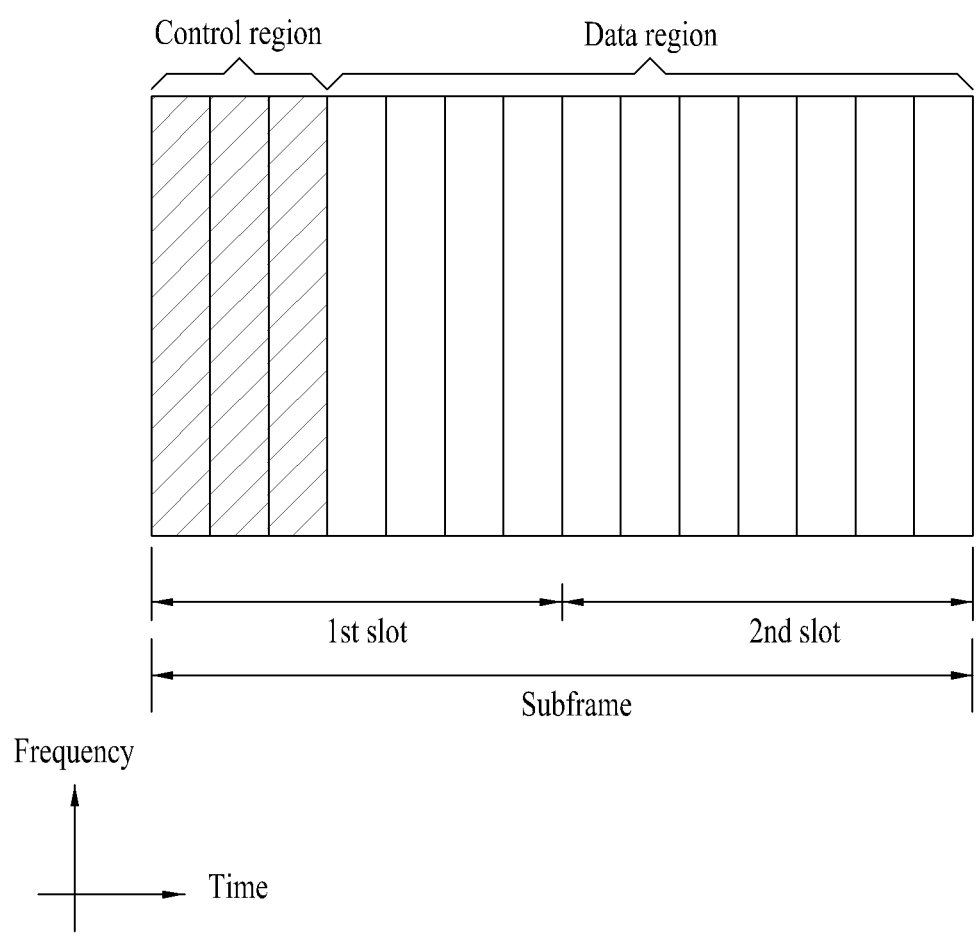
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
| --- | --- | --- | --- |
| Type | Aggregation Level L | Size [in CCEs] | PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
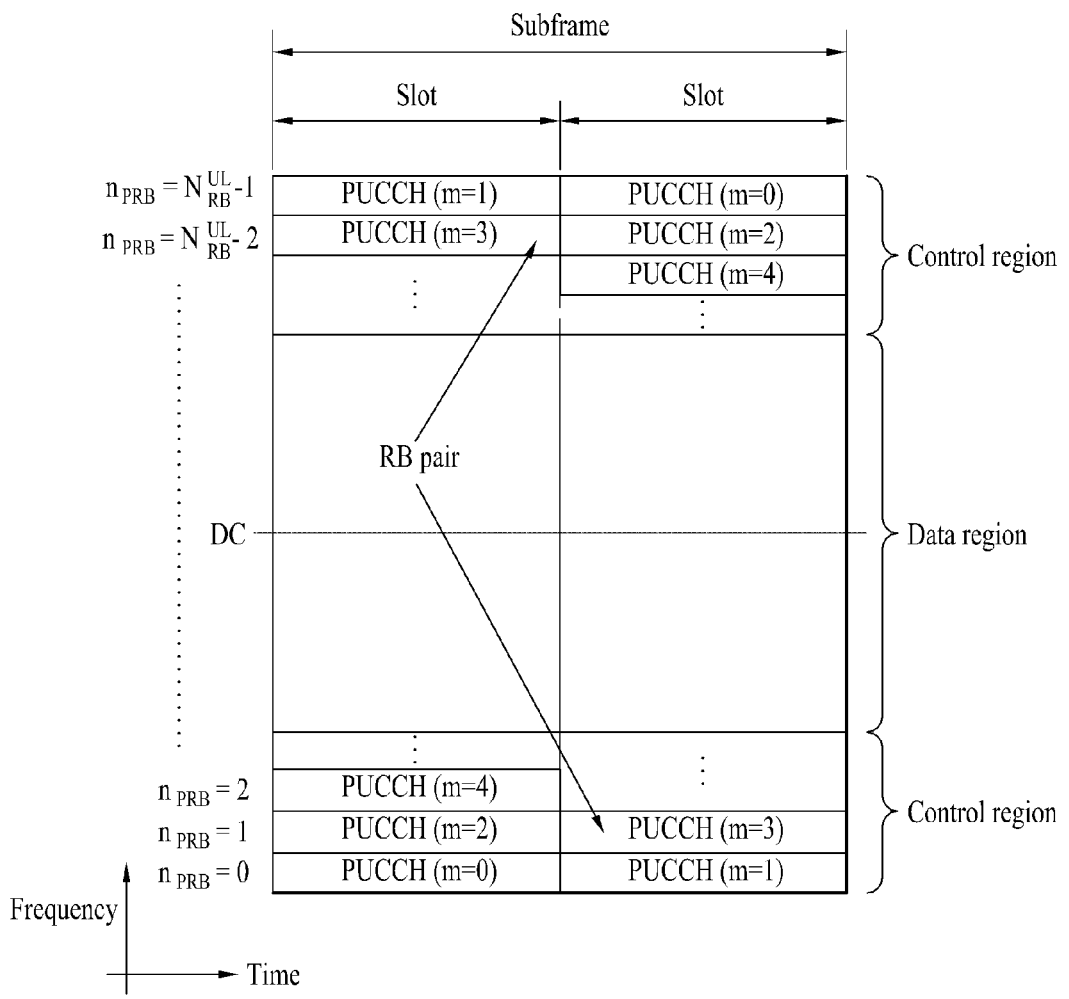
FIG. 4 is a diagram showing an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

A wireless communication system such as LTE requires feedback of channel state information (CSI) from a UE in order to determine data transmission scheme such as scheduling, precoding and modulation and coding scheme (MCS). For example, in LTE Rel-11, an eNB assigns, to a UE, a CSI-reference signal (RS) which is an RS for data channel measurement and a CSI-interference measurement (IM) which is an interference measurement resource, in order to perform CSI feedback. At this time, a combination of one CSI-RS and one CSI-IM is defined by a CSI process. The UE, to which the CSI process is assigned, measures spatial features and strength of a received signal from the CSI-RS, measures spatial features and strength of an interference signal from the CSI-IM, determines a rank indicator (RI), a precoding matrix indicator (PMI) and a channel quality indicator (CQI) of the CSI process, and reports the RI, the PMI and the CQI to the eNB. In an LTE Rel-11 system, a UE may be assigned a plurality of CSI processes to receive data transmitted from a plurality of eNBs or transmission points (TPs) according to a coordinated multiple point transmission/reception (CoMP) scheme. In addition, the UE feeds CSI derived from each CSI processor back to the eNB according to an independent period and a subframe offset.

The CQI of the CSI feedback information means a signal to interference and noise ratio (SINR) measured by the UE, and the eNB determines an MCS level suitable for a channel state, that is, a link state, of the UE based on the CQI information. A scheme for performing link adaptation based on the SINR information measured by the above method is referred to as inner loop link adaptation (ILLA). However, due to measurement errors of the UE, transmission delay of the CSI and quantization errors of CSI feedback, the CQI has lower accuracy than that of the actual SINR value. Accordingly, since the eNB cannot trust accuracy of the CSI feedback of the UE, correction for maintaining a packet error rate (PER) required by a system is performed. In an LTE system, a link adaptation scheme for increasing an SINR offset in case of ACK for transmitted packets, decreasing the SINR offset in case of NACK for transmitted packets, and determining an MCS level based on the SINR offset applied to CQI is being considered. This link adaptation scheme is referred to as outer loop link adaptation (OLLA). As a more detailed example, a relational expression of the SINR offset and the PER in OLLA may be expressed as follows.

$$PER=1/(1+A_{down}/A_{up}). \quad \text{Equation 1}$$

where, $A_{up}$ denotes the level of the SINR offset increased in case of ACK in dBs, $A_{down}$ denotes the level of the SINR offset decreased in case of NACK in dBs. For example, assume that an actually measured SINR is $SINR_0$ and a fed-back SINR is $CQI_0$. An OLLA operation upon $(SINR_0 > CQI_0)$ is shown in FIG. 5.

Figure 5:
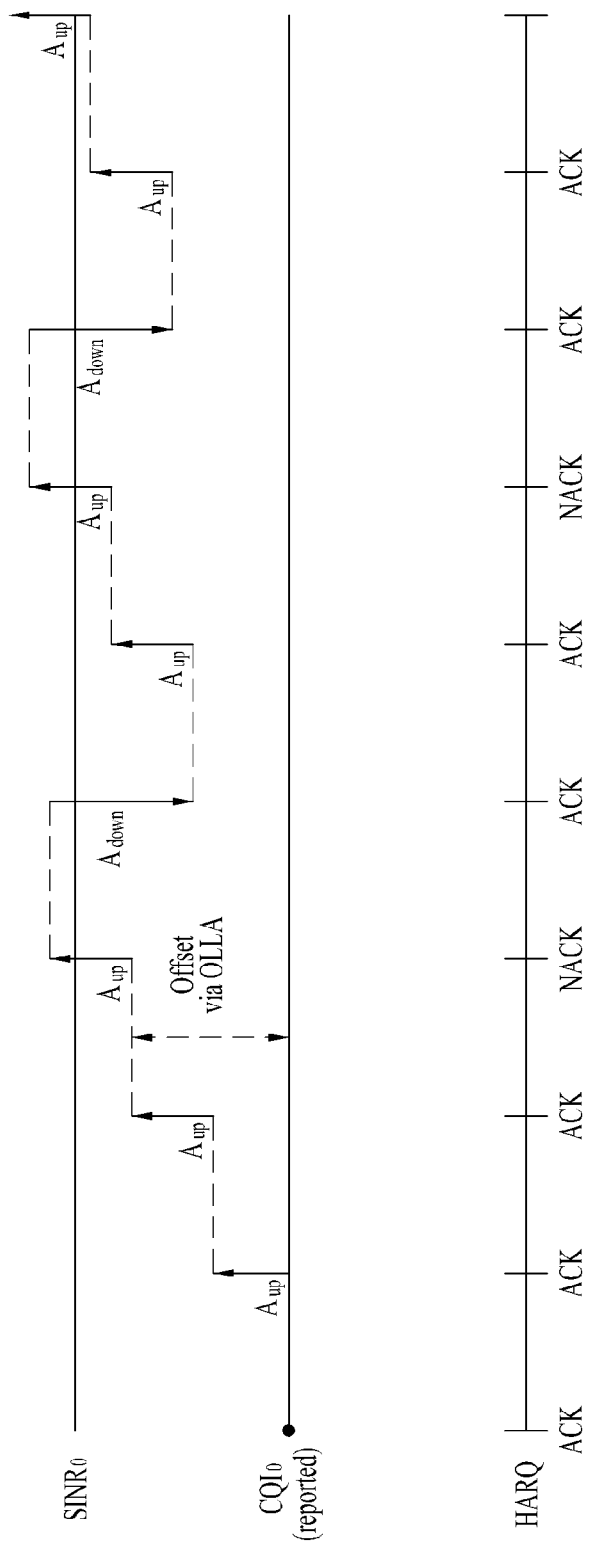
FIG. 5 is a diagram showing a link adaptation scheme according to conventional technology.

Referring to FIG. 5, the $CQI_0$ value increases by $A_{up}$ in case of ACK. Since the UE is scheduled according to the increased $CQI_0$ value and scheduling at an arbitrary moment (in FIG. 5, after receiving third ACK) is performed according to the $CQI_0$ value exceeding $SINR_0$, NACK may occur and the $CQI_0$ value decreases by $A_{down}$ in case of NACK. By repeating this operation, scheduling converging on $SINR_0$ is performed.

Data is actually transmitted over a network as files having a relatively small size and a very dynamic traffic pattern may be formed over a network when scheduling is performed in packet units. For example, FIG. 6 shows a traffic change pattern in a multi-cell environment.

Figure 6:
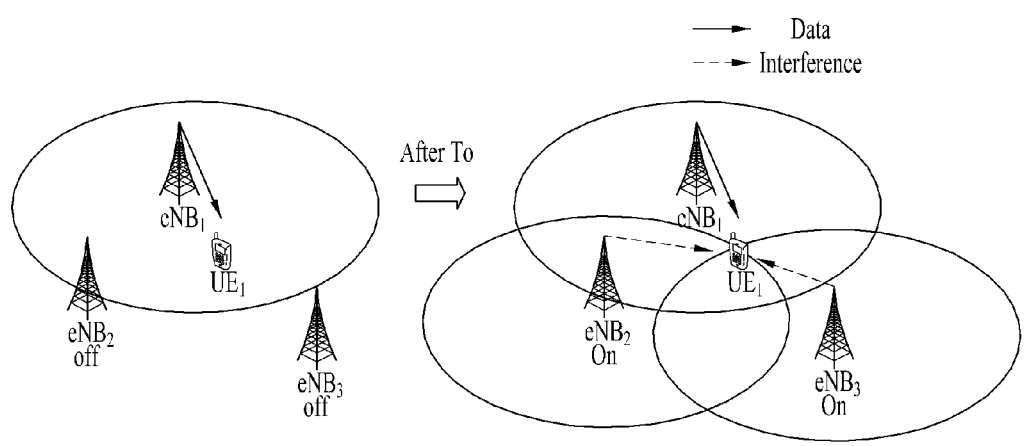
FIG. 6 is a diagram showing traffic change in a multi-cell environment.

FIG. 6 shows the case in which, when $eNB_1$, $eNB_2$ and $eNB_3$ exist and $UE_1$ receives data from $eNB_1$, interference influence on $UE_1$ is changed depending on whether neighboring eNBs ($eNB_2$ and $eNB_3$) transmit signals. That is, the left drawing shows an environment in which $eNB_2$ and $eNB_3$ do not provide data and thus interference influence on $UE_1$ does not occur. After a time $T_0$, new data packets occur in $eNB_2$ and $eNB_3$ and thus significant interference influence on $UE_1$ occurs. At this time, CSI fed back by the UE may be delayed by a measurement period. In addition, even after the eNB has received CSI feedback from the UE, a processing time is required until scheduling and thus processing delay for the CSI may further occur. However, if the CSI is delayed, an interference pattern when CSI is measured and an interference pattern when actual CSI is applied to perform scheduling may be different. That is, new traffic may occur during a CSI measurement period and a processing delay time such that CQI fed back by the UE has a value excessively higher than an actual channel state or existing traffic may be finished during the CSI measurement period and the processing delay time such that CQI fed back by the UE has a value excessively lower than an actual channel state. In general, assume that, in OLLA, a step size (e.g., $A_{up}$, $A_{down}$) for an SINR offset is set to a small value for stability and an actual SINR of a UE is not significantly different from a CQI value fed back by the UE. Accordingly, if there is dynamic traffic as described above, it may be difficult to correct SINR change of the UE at the eNB via OLLA.

The present invention proposes a method for rapidly applying a channel state (e.g., SINR) of a UE to scheduling according to dynamic traffic from the viewpoint of a network. Hereinafter, detailed operation of the present invention will be described based on an LTE system as a detailed embodiment of the present invention.

Figure 7:
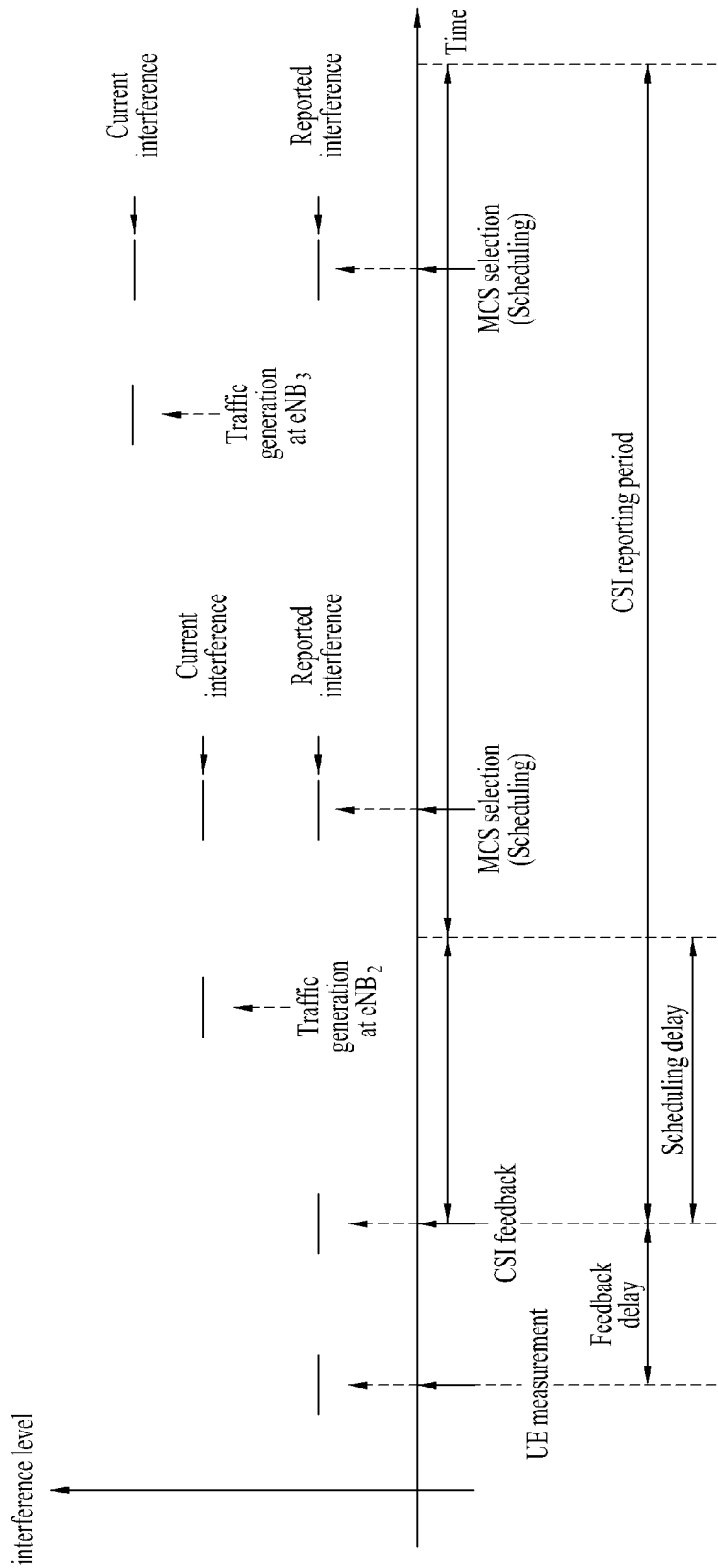
FIG. 7 is a diagram showing a channel state difference between a channel state measurement time and a scheduling time according to dynamic traffic generation according to conventional technology.

According to a detailed embodiment of the present invention, a method for defining a time for allowing data traffic generation or a time for restricting traffic generation in each cell of a network configured by a plurality of cells (e.g., eNBs or TPs) for the purpose of cooperative transmission will be described. In general, traffic is generated at an arbitrary time and thus arbitrary traffic generation in a neighboring cell may cause dynamic interference influence on specific UEs located at a cell edge. In particular, due to CSI processing delay and CSI measurement period, it may be difficult to apply dynamic interference influence according arbitrarily generated traffic by ILLA. For example, during CSI processing delay and CSI measurement period, if traffic is abruptly generated or disappears, an interference level may significantly increase or decrease as compared to CSI fed back by the UE. FIG. 7 shows a situation shown in FIG. 6.

In FIG. 7, assume that two scheduling processes are performed with respect to data transmitted to $UE_1$. In a first scheduling process, mismatch between CSI and an actual link (or channel) state of a UE occurs due to interference influence according to traffic generation at $eNB_2$ and, in a second scheduling process, mismatch between CSI and an actual link state of a UE occurs due to interference influence according to traffic generation at $eNB_3$. Accordingly, the present invention proposes a method for defining a time for allowing traffic generation or a time for restricting traffic generation in each cell of a network configured for the purpose of cooperative transmission. For example, the time for allowing traffic generation or the time for restricting traffic generation may be set by a coordinator with respect to all cells or may be determined by negotiation between cells.

Figure 8:
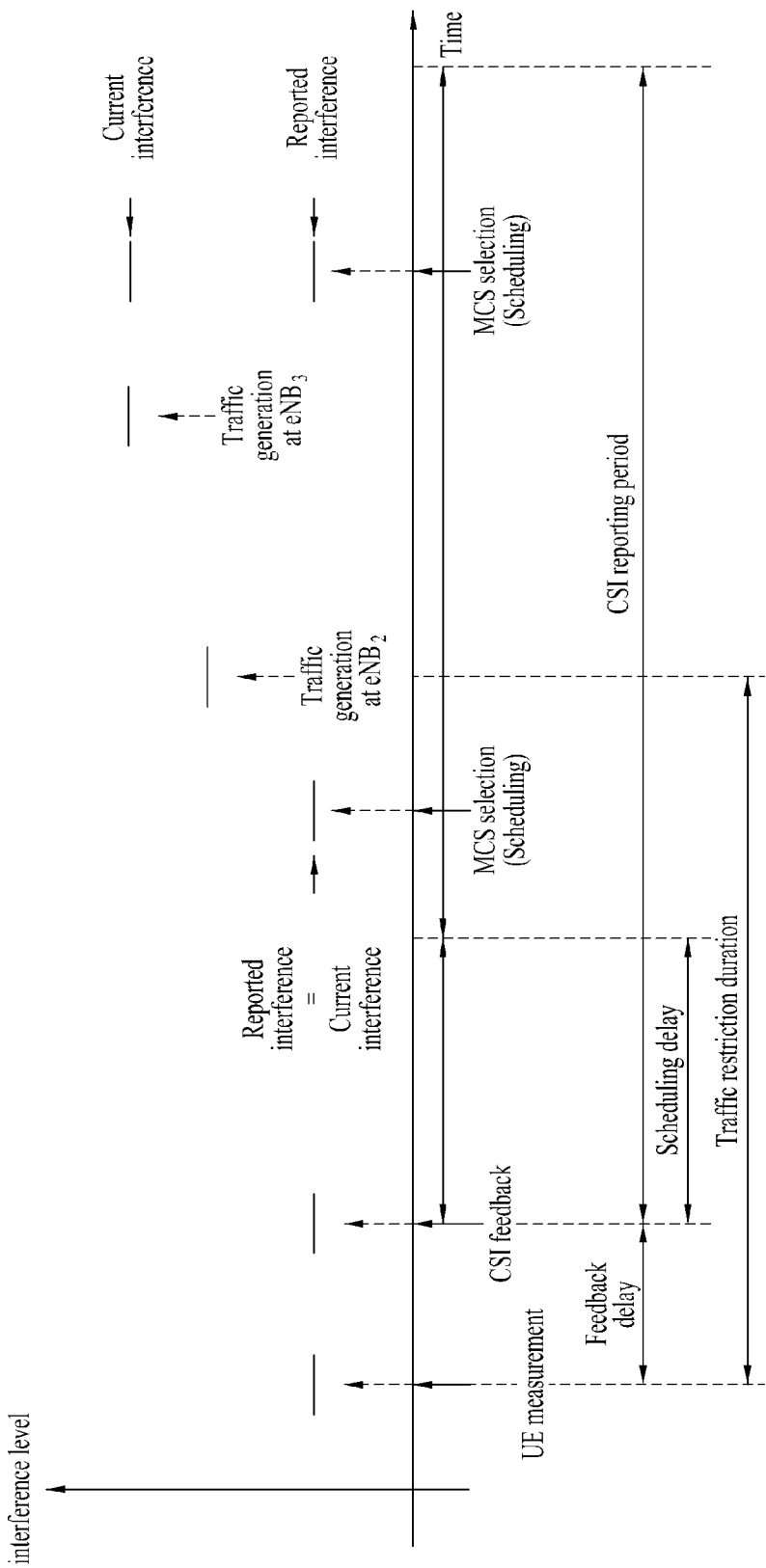
FIG. 8 is a diagram showing an example of reducing a channel state difference according to one embodiment of the present invention.

According to a detailed embodiment of the present invention, a method for setting a time for restricting traffic generation, that is, a traffic generation restriction time, by a predetermined offset value and a duration value based on a specific time pre-negotiated with a UE per cell (e.g., eNB or TP) will be described. The traffic generation restriction time may be used for CSI-IM measurement accuracy of the UE. For example, assume that $UE_1$, which receives a service from $eNB_1$, measures interference at a specific time and, at this time, traffic is not generated at $eNB_2$, which is a neighboring cell, and thus interference influence is not applied to CSI. When $eNB_1$ performs scheduling with respect to $UE_1$ using CSI received from $UE_1$ later, an MCS level having no interference influence on $eNB_2$ is selected. However, if traffic is generated at $eNB_2$ between the CSI report time and the MCS level selection time, causing unexpected interference, a probability that transmission of data to $UE_1$ fails increases due to an MCS level optimistically predicted as compared to an actual link state. In this case, even in some durations in which $UE_1$ is scheduled, traffic transmission from $eNB_2$ may be restricted such that an MCS level corresponding to the CSI-IM measurement time of $UE_1$ relatively coincides with an actual link state. FIG. 8 shows the case in which traffic of $eNB_2$ is restricted during a predetermined duration (e.g., traffic generation restriction duration) from the CSI-IM measurement time of the UE in FIG. 7.

Figure 9:
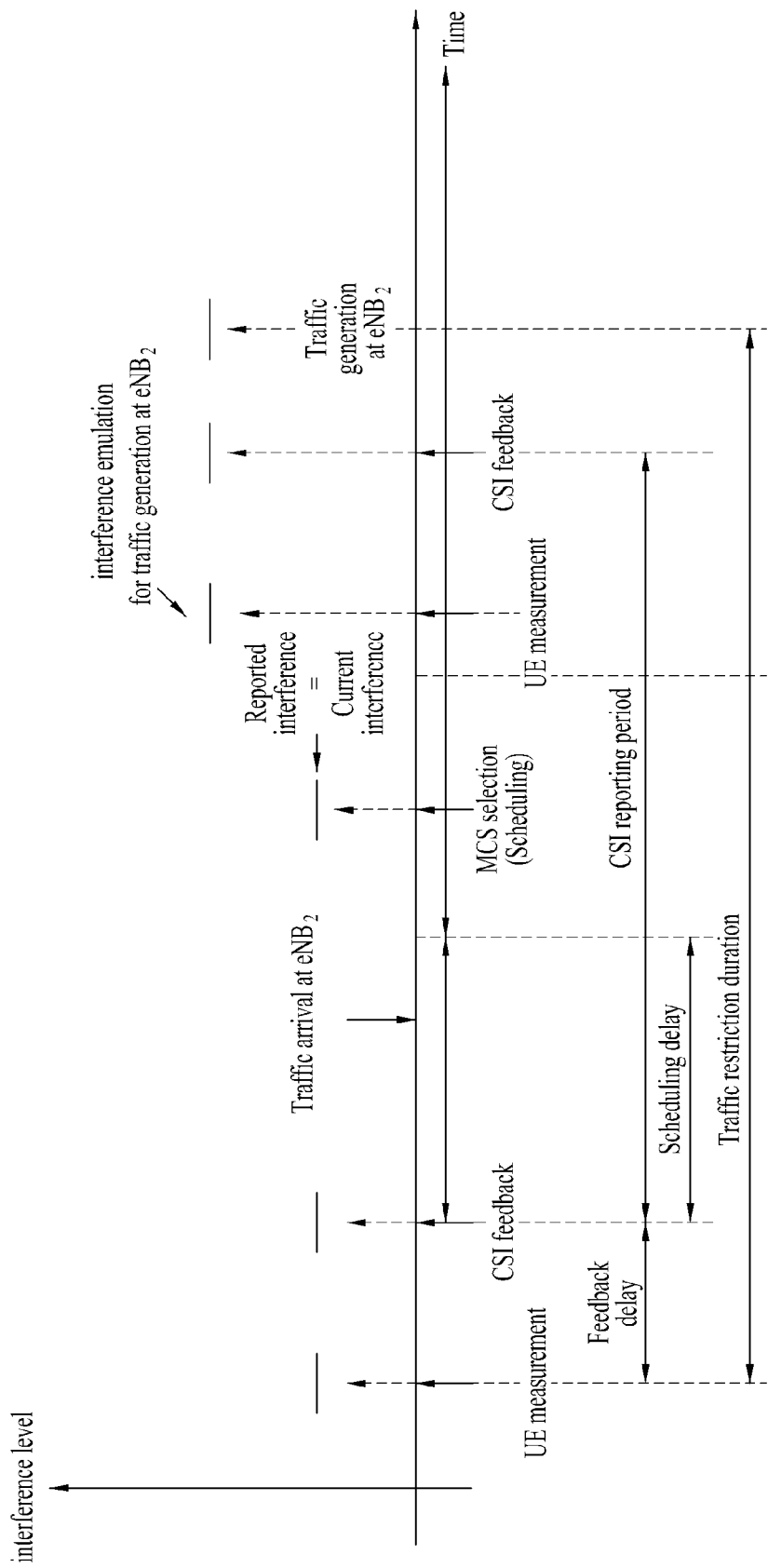
FIG. 9 is a diagram showing an example of reducing a channel state difference according to one embodiment of the present invention.

In FIG. 8, assume that two scheduling processes are performed with respect to data transmitted to $UE_1$. In a first scheduling process, traffic generation at $eNB_2$ is restricted such that CSI coincides with an actual link state of a UE and, in a second scheduling process, mismatch between CSI and an actual link state of a UE occurs due to interference influence according to traffic delay at $eNB_2$ and traffic generation at $eNB_3$. Accordingly, as compared to FIG. 7, the number of times of occurrence of mismatch between CSI and the actual link state of the UE is reduced from two to one. At this time, a network may provide cells with a time and initial offset referred to for a downlink traffic generation restriction time and information about the traffic generation restriction duration. At this time, if interference measurement resources such as CSI-IM are present in the traffic generation restriction duration of the present invention and traffic arrives in the traffic generation restriction duration before $UE_1$ measures CSI-IM via the CSI-IM, interference influence caused by traffic generation after the traffic generation restriction duration may be reflected by transmitting a dummy signal using the CSI-IM in advance. FIG. 9 shows the above example, in which the CSI-IM in the traffic generation restriction duration reflects interference influence of traffic which is predicted to arrive after the traffic generation restriction duration in advance.

More specifically, in FIG. 9, the network can confirm the fact that traffic of $eNB_2$ has arrived in the traffic generation restriction duration and $eNB_2$ transmits the dummy signal using interference measurement resources such as CSI-IM at a UE measurement time and reflects future interference influence on $UE_1$ to be caused by traffic which will arrive after the traffic generation restriction duration, in advance.

Figure 10:
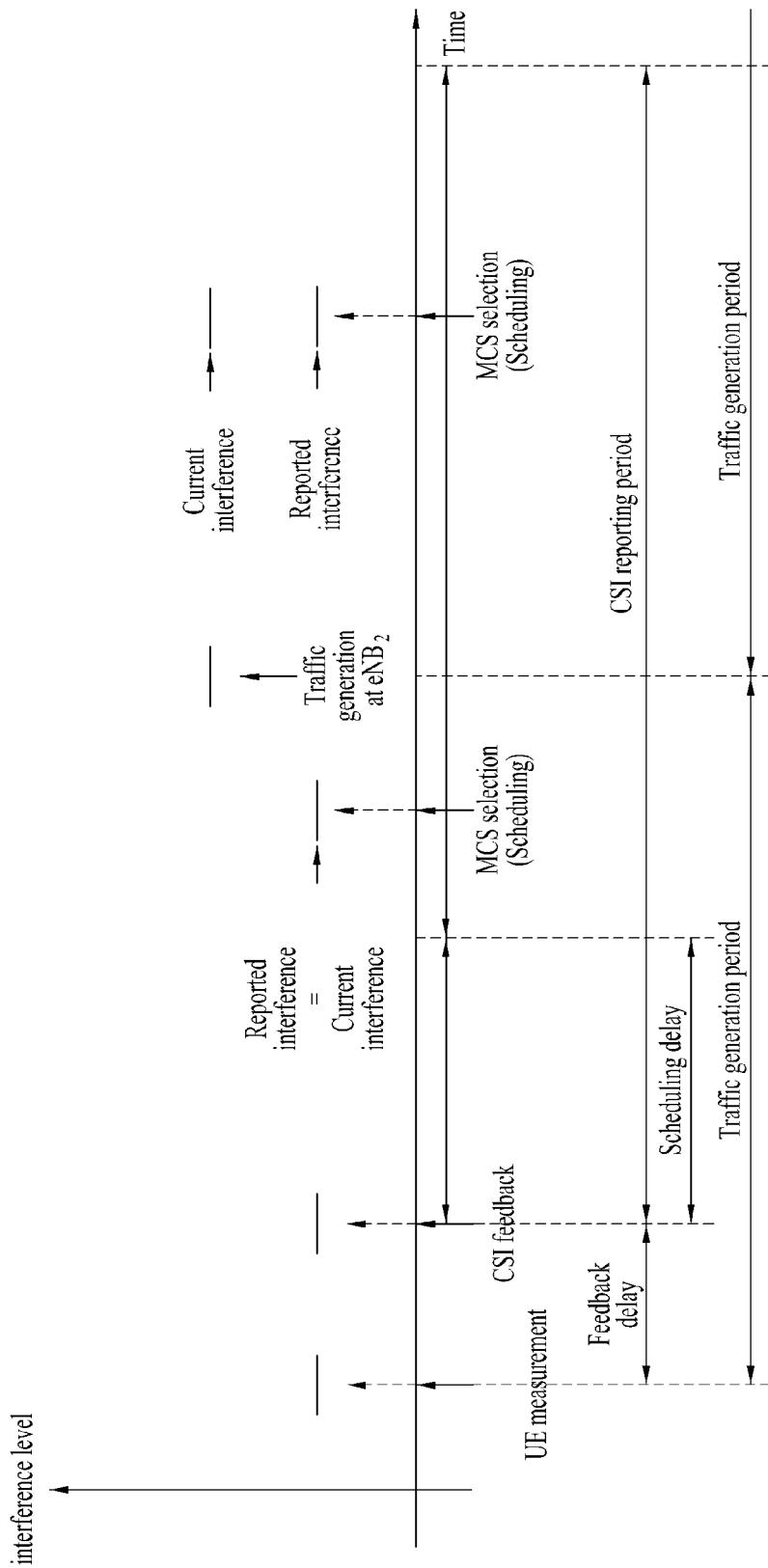
FIG. 10 is a diagram showing an example of reducing a channel state difference according to one embodiment of the present invention.

According to a detailed embodiment of the present invention, a method for setting a time for allowing traffic generation, that is, a traffic generation allowance time, according to an offset value and a period value of a time unit will be described. As a detailed example of setting the traffic generation allowance time according to the operation of the present invention, a method for setting an offset value and a period value of a time unit per cell (e.g., eNB or TP) may be considered. That is, cells may generate traffic only at a specific time indicated by the network and, at this time, the traffic generation allowance time may be periodically generated. FIG. 10 shows an example in which mismatch of CSI in FIG. 7 is reduced when the traffic generation allowance time is periodically given.

In FIG. 10, assume that two scheduling processes are performed with respect to data transmitted to $UE_1$. In a first scheduling process, traffic generation at $eNB_2$ is restricted such that CSI coincides with an actual link state of a UE and, in a second scheduling process, mismatch between CSI and an actual link state of a UE occurs due to interference influence according to traffic generation delay at $eNB_2$. As compared to FIG. 8, it can be seen that mismatch between CSI and the actual link state of the UE still occurs in the second scheduling process, but traffic generation of $eNB_3$ is delayed and thus a mismatch degree is reduced. At this time, the traffic generation allowance time may be set to a single value within the network configured for cooperative transmission or set per cell (e.g., eNB or TP). At this time, the traffic generation allowance period according to the present invention may be interpreted as a traffic generation restriction duration. If interference measurement resources such as CSI-IM are present in the traffic generation restriction duration and traffic arrives in the traffic generation restriction duration before the UE measures interference via the CSI-IM, interference influence of delayed traffic generation after the traffic generation restriction duration may be reflected by transmitting a dummy signal using the CSI-IM in advance.

If the traffic generation allowance time, channel measurement or CSI report time of $UE_1$ and/or the scheduling time of $eNB_1$ are appropriately aligned, it is possible to minimize mismatch between the reported CSI and the actual link state of $UE_1$ at the scheduling time. The same is true in the embodiments described with reference to FIGS. 8 to 9.

According to a detailed embodiment of the present invention, a method of independently applying a traffic generation restriction time or a traffic generation allowance time according to a cell (e.g., eNB or TP) included in a network for cooperative transmission or a data unit (e.g., packet) will be described. When the traffic generation restriction time or the traffic generation allowance time is applied, UEs, which receive services from neighboring cells, more accurately reflect interference influence caused by transmitting traffic in a CSI report. Accordingly, the traffic generation restriction time or the traffic generation allowance time may be restrictively applied to interference cells which may have excessive interference influence on a specific UE. For example, cells, to which the traffic generation restriction time or the traffic generation allowance time is applied, may be neighboring cells to which a CoMP UE sensitive to interference belongs. In addition, the traffic generation restriction time or the traffic generation allowance time may be advantageously applied according to traffic. For example, among CoMP schemes, if a point selection scheme in which a UE receives data from neighboring cooperative cells except for a serving cell thereof is used, the traffic generation restriction time and the traffic generation allowance time needs to be applied such that data traffic generation according to point selection is reflected in CSI-IM of neighboring UEs.

According to another detailed embodiment of the present invention, a method for, at cells which delay traffic generation in a traffic generation restriction duration, delivering, to neighboring cells, information indicating that traffic will be generated after the traffic generation restriction duration when the traffic generation restriction time is set by a predetermined offset and duration value based on a specific time pre-negotiated with a UE per cell (e.g., eNB or TP) or when a traffic generation allowance time is set by an offset value and period value of a time unit will be described. For example, in FIG. 8, delayed traffic of $eNB_2$ is generated after the traffic generation restriction duration such that interference influence on $UE_1$ increases. At this time, when $eNB_2$ notifies $eNB_1$ that traffic will be generated after the traffic generation restriction duration during the traffic generation restriction duration, $eNB_1$ may reflect interference according to traffic generation at $eNB_2$ at the second scheduling time of FIG. 8 to correct CSI previously fed back by $UE_1$.

Similarly, even in FIG. 10, delayed traffic of $eNB_2$ is generated during the traffic generation allowance period to increase interference influence on $UE_1$. At this time, if $eNB_2$ notifies $eNB_1$ that traffic will be generated after the traffic generation restriction duration during the traffic generation restriction duration, eNB$_1$ may reflect interference according to traffic generation at eNB$_2$ at the second scheduling time of FIG. 10 to correct CSI previously fed back by UE$_1$.

According to another detailed embodiment of the present invention, a method for setting a threshold for a measurement time and an interference change amount with respect to a UE which receives a service within the network if the traffic generation allowance time is applied within a network configured by a plurality of cells (e.g., eNBs or TPs) for cooperative transmission, measuring the interference change amount at the UE, and feeding the interference change amount back to the cell which provides the service to the UE if the interference change amount exceeds the threshold will be described. Even when the traffic generation allowance time and/or traffic generation restriction time is applied according to the operation of the present invention, the UE may not reflect interference influence on traffic generated in neighboring cells while CSI is periodically measured in CSI-IM. At this time, interference influence which is not reflected in CSI-IM may not be fed back and thus may not be solved by link adaptation based on ILLA and should be corrected by correction capability of the eNB, that is, OLLA. However, traffic generation and disappearance at neighboring cells may cause significantly large interference change. Therefore, if the interference change is corrected by the step size of general OLLA, a correction time is long and performance deterioration may occur from the viewpoint of traffics having a short transmission time. Accordingly, the present invention proposes a method for, at a cell, notifying a UE of a threshold and a measurement period via a higher layer signal such as RRC and, at the UE, feeding an interference change amount back to a serving cell thereof if the interference change amount greater than the threshold is detected. At this time, the information is used to aid in the link adaptation process at the eNB, has 1 bit, and may be jointly encoded with ACK/NACK information and fed back.

According to another detailed embodiment of the present invention, an E-OLLA scheme for, at an arbitrary cell, defining N hypotheses for traffic at neighboring cells within a network configured by cells (e.g., eNBs or TPs) for cooperative transmission, pre-calculating CSI of each hypothesis and instantaneously changing a step size of OLLA using the N CSI values will be described.

Hypothesis CSI Calculation i) An arbitrary cell defines N hypotheses for traffic at the cell and pre-calculates CSI of each hypothesis. The calculation process may be performed via a plurality of CSI-IM for emulating a virtual interference signal with respect to a UE or may be performed by setting CSI-IM assuming that traffic is not generated in all neighboring cells within the network for cooperative transmission and reflecting a received signal reference power (RSRP) value corresponding to a cell in which traffic is generated per hypothesis according to the N hypotheses of the traffic.

ii) The calculated CSI is aligned in order of level (e.g., $CSI_0 < CSI_1 < CSI_2 < \ldots$).

Reference CSI i) the cell has a time for controlling the step size of OLLA when signaling or feedback for interference change is received from the network or the UE or according to a predetermined period.

$CSI_n$ set before the above-described time becomes a reference CSI.

Step Size Adaptation

At a step size control time,

A. when ACK occurs,

A-i. if a higher value $CSI_{+1}$ is present,

A-i-1. $CSI_m$ in which distance or metric with $CSI_n$ is equal to distance or metric with $CSI_{n+1}$ is detected. The step size of OLLA is changed and applied as follows.

$$-A_{up} = CR_m - CS_n$$

A-i-2. after operation A-i-1, if ACK is output upon data transmission, a reference CSI is changed to $CSI_{+1}$ and operation A is performed again.

A-i-3. after operation A-i-1, if NACK is output upon data transmission, a reference CSI is not changed and a step size adaptation process is stopped. That is, a predetermined default OLLA step size is used.

A-ii. if a higher value $CSI_{n+1}$ is not present,

A-II-1. a reference CSI is not changed and a step size adaptation process is stopped. That is, a predetermined default OLLA step size is used.

B. when NACK occurs,

B-i. if a lower value $CSI_{n-1}$ is present,

B-i-1. $CSI_m$ in which distance or metric with $CSI_n$ is equal to distance or metric with $CSI_{n-1}$ is detected. The step size of OLLA is changed and applied as follows.

$$-A_{down} = CSI_n - CSI_m$$

B-i-2. after operation B-i-1, if NACK is output upon data transmission, a reference CSI is changed to $CSI_{n-1}$ and operation A is performed again.

B-i-3. after operation B-i-1, if ACK is output upon data transmission, a reference CSI is not changed and a step size adaptation process is stopped. That is, a predetermined default OLLA step size is used.

B-ii. if a lower value $CSI_{n-1}$ is not present,

B-II-1. a reference CSI is not changed and a step size adaptation process is stopped. That is, a predetermined default OLLA step size is used.

According to one embodiment of the present invention, it is possible to efficiently send information necessary for a CoMP scheme and to further improve quality of a communication environment via CoMP.

Figure 11:
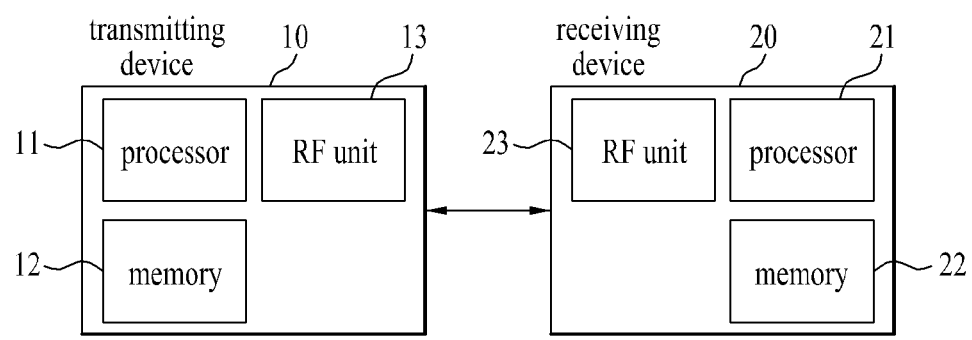
FIG. 11 is a block diagram showing an apparatus for implementing embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be used for a wireless communication apparatus such as a user equipment (UE), a relay and an eNB.

What is claimed is:

1. A method for link adaptation in a wireless communication system, the method comprising:
   receiving, by a base station, a value of a channel state which a user equipment (UE) measures at a first time instance;
   transmitting, by the base station to the UE, scheduling information based on the received value of the channel state at a second time instance, the second time instance being prior to a next report of a value of a channel state which the UE measures,
   wherein traffic generation of a neighboring base station is restricted for at least a restriction duration between the first time instance and the second time instance to accord the received value of the channel state with a value of a channel state at the second time instance;
   receiving, by the base station from the neighboring base station, information indicating that traffic will be generated after the restriction duration; and
   correcting, by the base station, the received value of the channel state using the information received from the neighboring base station such that the corrected value reflects an interference due to the traffic to be generated by the neighboring base station at a next scheduling time instance,
   wherein the corrected value is used by the base station for scheduling information to be transmitted to the UE at the next scheduling time instance.

2. The method according to claim 1, wherein the restriction on traffic generation of the neighboring base station is periodically configured.

3. The method according to claim 1, wherein the restriction on traffic generation of the neighboring base station is configured by negotiation between base stations or by a specific entity in the wireless communication system.

4. A method for link adaptation in a wireless communication system, the method comprising:
   receiving, by a base station, information about a restriction duration in which traffic generation of the base station is restricted;
   transmitting, by the base station to a neighboring base station, information indicating that traffic will be generated after the restriction duration;
   delaying, by the base station, traffic generation in the restriction duration according to the received information; and
   generating, by the base station, traffic after the restriction duration,
   wherein the restriction duration is configured to accord a value of a channel state which a user equipment (UE)

served by a neighboring base station has reported at a first time instance with a value of a channel state at a second time instance at which the neighboring base station transmits scheduling information to the UE based on the value of the channel state received at the first time instance, wherein the information indicating that traffic will be generated after the restriction duration is used by the neighboring base station to correct a reported value of the channel state at a first time instance such that the corrected value reflects an interference due to the traffic generated by the base station at a next scheduling time instance, and wherein the corrected value is used by the neighboring base station for scheduling information to be transmitted to the UE at the next scheduling time instance.

5. The method according to claim 4, further comprising transmitting a dummy signal using resources for interference measurement if traffic to be generated is present after the duration.

6. The method according to claim 4, wherein the restriction duration is periodically configured.

7. The method according to claim 4, wherein the restriction duration is configured by negotiation between base stations or by a specific entity in the wireless communication system.

8. A base station configured to perform link adaptation in a wireless communication system, the base station comprising:

a transceiver,
a memory; and
a processor operatively connected to the memory and the transceiver, and configured to:
  receive a value of a channel state which a user equipment (UE) measures at a first time instance;
  transmit, to the UE, scheduling information based on the received value of the channel state at a second time instance, the second time instance being prior to a next report of a value of a channel state which the UE measures,
  wherein traffic generation of a neighboring base station is restricted for at least a restriction duration between the first time instance and the second time instance to accord the received value of the channel state with a value of a channel state at the second time instance;
  receive, from the neighboring base station, information indicating that traffic will be generated after the restriction duration; and
  correct the received value of the channel state using the information received from the neighboring base station such that the corrected value reflects an interference due to the traffic to be generated by the neighboring base station at a next scheduling time instance,
  wherein the corrected value is used by the processor for scheduling information to be transmitted to the UE at the next scheduling time instance.

* * * * *